May 22, 1956
J. SMITH
2,746,198
ELECTRIC FISH GIGGER
Filed Sept. 30, 1953
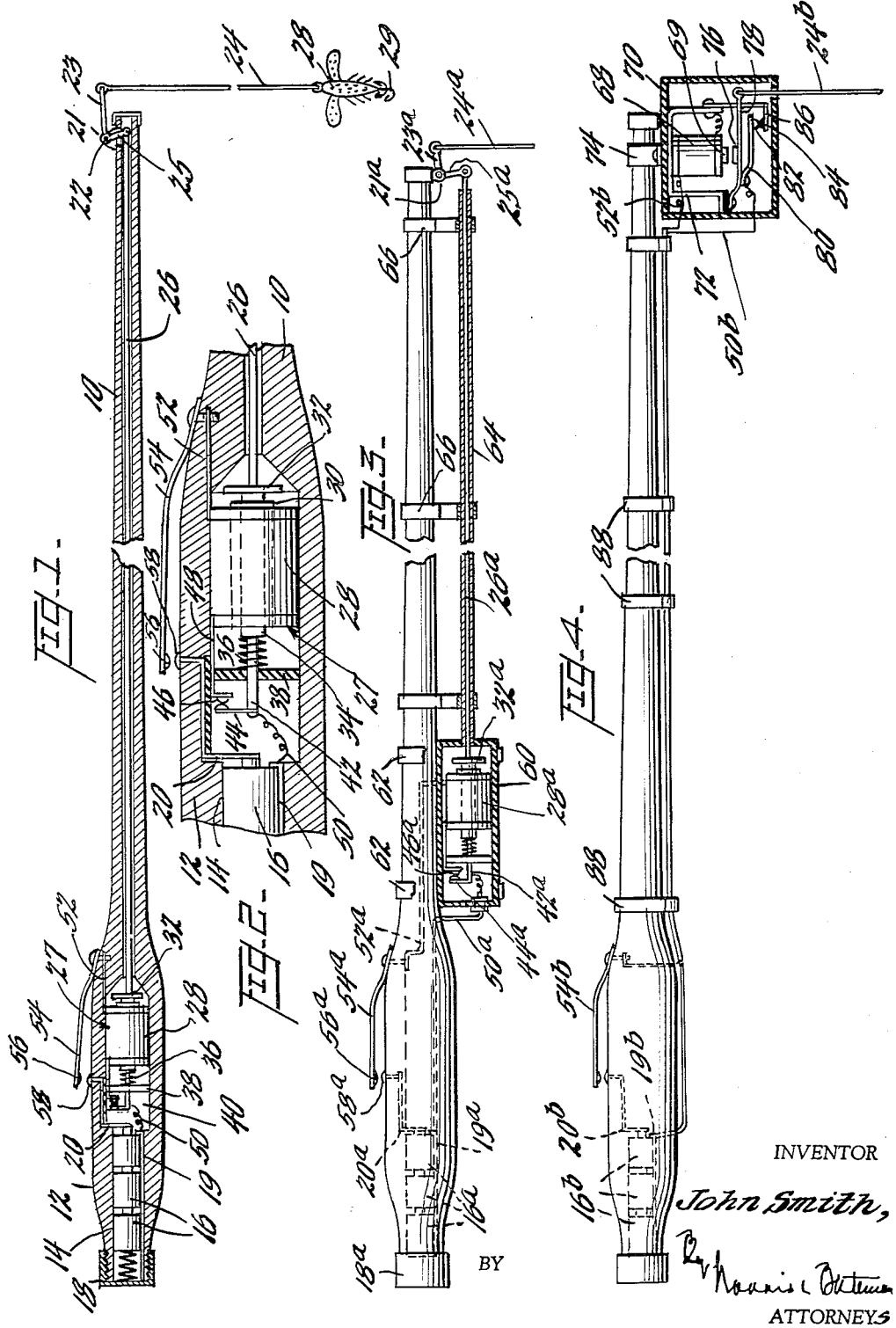
INVENTOR
John Smith,
BY
ATTORNEYS 2,746,198

ELECTRIC FISH GIGGER

John Smith, Jackson, S. C.

Application September 30, 1953, Serial No. 383,294

7 Claims. (Cl. 43—19.2)

The primary object of the present invention is to provide a fish gigger which may be applied readily and inexpensively to fishing rods or poles of the ordinary types and may be operated electrically from a small battery to gig or vibrate effectively and with a small amount of current an artificial lure which may be of any usual or suitable type, whereby the lure is gigged bodily on the surface of the water to cause it to wiggle, tremble, vibrate or otherwise simulate the movements of a minnow, insect or other living object such as may usually be found on or near the surface of the water and to thereby attract fish, the lure having a suitable number of hooks thereon on which the fish thus attracted are caught.

The preferred embodiments of the invention are shown in the accompanying drawing, in which—

Figure 1 is a longitudinal vertical section of a fishing rod embodying the present invention.

Figure 2 is a detail vertical sectional view, on an enlarged scale, of the vibrator shown in Fig. 1.

Figure 3 is a side elevation, partly in section, of another embodiment of the present invention.

Figure 4 is a side elevation, partly in section, of a further embodiment of the present invention.

Similar parts are designated by the same reference numerals in the several figures of the drawing.

In the embodiment of the invention shown in Figs. 1 and 2, 10 represents a hollow fishing rod or pole which may be composed of cane or a tube of metal or other suitable material and having a hollow handle 12 at its inner end by which the rod may be held by the hand while in use. The handle is formed interiorly with a chamber 14 which is open at its rear end, and is adapted to contain an electric battery composed of a suitable number of dry cells 16 such as those commonly used in flash lights. The open rear end of this chamber is closed by a detachable screw cap 18 which is preferably of metal and is connected to one terminal 19 for the battery when this cap is screwed onto the end of the rod, another terminal contact 20 being provided at the other end of the battery chamber or compartment for the other terminal of the battery.

The outer end of the rod or pole is provided with a rocker 21 which is pivoted at 22 on the upper side of the rod, the rocker being in the form of a bell-crank having one arm 23 extending forwardly beyond the outer end of the rod and having an eye in which is engaged an eye on the upper end of a leader 24 composed of steel or other metallic wire. The leader, which is preferably about 6 feet in length, is adapted to suspend a suitable form of lure on the surface of the water, the lure 28 shown in the present instance being in the form of an insect having a body composed of cork or being of a buoyant construction so that it will float on the surface of the water, and having relatively stiff wings projecting from its opposite sides which flutter when the lure is gigged or vibrated. A suitable number of fish hooks 29 are attached to the lure on which fish striking the lure will be caught, three of such hooks being shown, for example, in the present instance.

The other arm 25 of the rocker extends downwardly into the hollow interior of the rod and is provided with an eye in which an eye on the forward end of a vibratory shaft 26 is engaged, this shaft being composed of steel or other suitable metal and extending longitudinally within the bore of the rod to the rear or inner portion of the rod where it is connected to an electro-magnetic vibrator 27 housed within the hollow handle of the rod.

The vibrator 27 is of the vibratory armature type having an electro-magnetic coil and make and break contacts which are engaged intermittently to cause vibration of the armature at a frequency comparable with that of an ordinary electric buzzer. As shown in Figs. 1 and 2, the vibrator comprises an electro-magnet 28 having an iron or magnetic tubular core 30, and an iron or magnetic armature 32 to which the rear end of the shaft 26 is fixed, and having a brass or other non-magnetic plunger 34 fixed thereto and slidable in the tubular magnet core 30, vibration of the armature being transmitted to the shaft 26 and producing endwise vibration thereof, rocking the rocker 21 on its pivot, and the latter imparting up and down vibration to the leader 24 and the lure connected thereto. The armature is retracted and held yieldingly in its retracted position by a coiled compression spring 36 which is interposed between the rear end of the plunger 34 and an abutment 38 suitably fixed in the chamber 40 containing the vibrator. A rod 42 is fixed to the plunger 34 and carries a contact 44 which, while the electro-magnet is energized, engages a contact 46 fixed to a conductor strip 48 secured to a wall of the chamber 40 and having electrical connection with one terminal of the coil of the electro-magnet. The rod 42 carrying the contact 44 is electrically connected by a flexible conductor 50 to the battery terminal 19. The other terminal of the coil of the electro-magnet is connected by a conductor 52 to the movable member 54 of a push-button mounted on the upper side of the forward portion of the handle 12 of the rod, this member of the push-button having a contact 56 thereon which is engageable with a relatively fixed contact 58 on the upper side of the handle when the member 54 of the push-button is depressed, as by the thumb of the hand of the fisherman holding the rod. While the push-button is depressed, current from the battery will flow through a circuit which will be completed by engagement of the contacts 44 and 46, thereby energizing the coil of the magnet and attracting its armature 32, and attraction of the armature separates the contacts 44 and 46 thereby breaking the circuit through the coil of the magnet, the spring 36 then acting to retract the armature and re-engage the contacts 44 and 46, causing the magnet to be again energized and its armature again attracted. The successive making and breaking of the magnet circuit through the contacts 44 and 46 causes the armature to vibrate rapidly while the push-button is held depressed, and these vibrations are transmitted directly and effectively through the shaft 26, rocker 21 and leader 24 to the lure, thereby gigging the lure on the surface of the water to attract the fish which, when they strike the lure, will be caught on one or another of the fish hooks thereon. In using a lure of the kind shown and described, the gigging movements imparted to the lure cause the wings thereof to flutter in a manner which simulates the movements of a living insect, and produce waves on the surface of the water, which are attractive to fish. Since the lure is connected directly to the armature of the electro-magnet through the leader 24, rocker and shaft 26 which parts are preferably metallic but have a relatively small amount of inertia, the vibrations of the magnet armature are transmitted efficiently to the lure, requiring a small amount of electric current.

In the embodiment of the invention shown in Fig. 3, the vibrator is of substantially the same construction as that shown in Figs. 1 and 2 but the vibrator is enclosed within a housing 60 which is attached to the under side of the fishing rod as by clips or clamps 62, and the steel or metallic vibratory shaft 26a which is attached at its rear end to the armature 32a of the electro-magnet 28a is mounted slidably in a tube 64 which may be composed of metal or other suitable material and extends along the under side of the fishing rod and is secured thereto by clips or clamps 66. The plunger rod 42a of the vibrator is connected by the conductor 50a to one terminal 19a of the battery and the other terminal 20a of the battery is connected to the relatively fixed contact 58a of the push-button, the movable member 54a of the push-button being connected by a conductor 52a to one terminal of the coil of the electro-magnet, and the other terminal of this coil being adapted to be connected through the make and break contacts 44a and 46a, rod 42a and conductor 50a to the battery terminal 19a. The operation of this embodiment of the invention is substantially the same as that described in connection with Figs. 1 and 2, the vibrator vibrating the shaft 26a longitudinally, thereby rocking the rocker 21a and vibrating the leader 24a vertically, thereby gigging the lure suspended therefrom.

Fig. 4 shows another embodiment of the invention in which the vibrator is suspended from the outer end of the fishing rod and comprises an electro-magnet 68 the core 69 of which is secured within a supporting frame 70 and to an inner bracket 72, the frame 70 being suitably secured to the under side of the outer end of the fishing rod as by a clip or clamp 74. An armature 76 is carried by a spring 78 one end of which is fixed to the bracket 72 and the other end of which is connected by an eye thereon to an eye on the upper end of a steel or metallic leader 24b, the lure being connected to the lower end of the leader, as shown in Fig. 1. The spring 78 acts to retract the armature when the magnet is de-energized, and this spring carries a contact arm or spring 80 having a contact 82 thereon which cooperates with a relatively fixed contact 84 secured to an arm 86 extending from the bracket 72. One terminal of the coil of the electro-magnet is connected by a conductor 52b to the terminal 20b of the battery 16b in the handle of the rod through the push-button 54b, and the other terminal of the coil of the electro-magnet is connected to the bracket 72 and the latter is connected through contacts 82 and 84 to the contact arm 80, the latter being connected by conductor 50b to the other terminal of the battery contained in the hollow handle in a manner similar to that shown in Figs. 1 and 3. The conductors 50b and 52b may be arranged to extend along the under side of the fishing rod and be secured thereto by clips or clamps 88. The operation of this embodiment of the invention is substantially the same as that described in connection with Figs. 1 and 2, except that the leader is connected directly to the armature of the vibrator so that the longitudinally vibratory shaft employed in Figs. 1 and 2 is not necessary in the arrangement shown in Fig. 4, the lure being lifted directly by attraction of the armature each time the magnet is energized by engagement of the make and break contacts 82 and 84, and these contacts being disengaged by such attraction of the armature to de-energize the magnet and permit downward movement of the lure, the vibratory movements thus imparted to the lure through the leader attracting the fish, as hereinbefore explained.

According to the present invention, the vibratory movements of the armature of the electro-magnet are transmitted to the lure directly and through connections which have very little inertia, so that the transmission is very efficient and the vibration of the lure requires a small amount of electric current.

I claim:

1. A fish gigger comprising a fishing rod, an electromagnetic vibrator carried thereby and having a vibrating armature and a circuit interrupter controlled thereby, means for supplying electrical current through the interrupter to the vibrator for intermittent operation thereof, an artificial lure, and vibratory means directly connected to the armature of the vibrator and to the lure for vibrating the lure on the surface of the water.

2. A fish gigger comprising a fishing rod, an electromagnetic vibrator carried thereby and having a vibrating armature and a circuit make and break device operated thereby, means carried by the fishing rod for supplying energizing current through the make and break device to the vibrator to vibrate its armature, an artificial lure, and a direct metallic vibration transmitting connection between the lure and the armature of the vibrator.

3. A fish gigger comprising a fishing rod having a hollow handle at one end, an electric battery contained in the hollow handle, an electro-magnetic vibrator carried by the rod and having a vibrating armature, means for connecting the battery to the vibrator for supplying energizing current thereto, an artificial lure, and means including a shaft extending longitudinally of the rod and adapted to vibrate relative thereto, said shaft being operatively connected to the armature of the vibrator and to the lure for transmitting vibration directly and independently of the rod from the armature to the lure.

4. A fish gigger as defined in claim 3, including a leader for suspending the lure, and a rocker arm mounted pivotally on the end of the fishing rod and directly connecting said shaft and leader.

5. A fish gigger comprising a hollow fishing rod, a shaft extending longitudinally within the rod, an electro-magnetic vibrator housed within the rod and having an armature connected directly to one end of said shaft, means for supplying electric current to the vibrator, a rocker arm pivotally mounted on the rod and operatively connected to the other end of said shaft, and a lure suspended from the rocker arm for vibration thereby.

6. A fish gigger comprising a fishing rod, a tube extending along the exterior of the rod and secured thereto, a shaft mounted in said tube and adapted to vibrate longitudinally therein, an electro-magnetic vibrator mounted on the rod in alinement with said tube and operatively connected to one end of said shaft, means for supplying electric current to the vibrator, a rocker arm pivotally mounted on the rod and operatively connected to the other end of said shaft, and a lure operatively connected to the rocker arm for vibration thereby.

7. A fish gigger comprising a fishing rod, an electromagnetic vibrator mounted on the rod and having a vibrating armature, means for supplying electric current to the vibrator, an artificial lure, and a leader suspended from the armature of the vibrator and connected to the lure for suspending it on the surface of the water and to transmit vibration from the armature of the vibrator directly to the lure.

References Cited in the file of this patent

UNITED STATES PATENTS

| 726,020 | Byran | Apr. 21, 1903 |
| 1,906,791 | Grossman | May 2, 1933 |
| 1,939,007 | Turner | Oct. 3, 1933 |
| 2,286,176 | Boisselier | June 9, 1942 |
| 2,559,475 | Sparkman | July 3, 1951 |
| 2,624,145 | Wehn | Jan. 6, 1953 |